US012394361B2

(12) United States Patent
Ozbas et al.

(10) Patent No.: US 12,394,361 B2
(45) Date of Patent: Aug. 19, 2025

(54) MULTIPLEXED COLUMN DRIVERS FOR PASSIVE-MATRIX CONTROL

(71) Applicant: X Display Company Technology Limited, Dublin (IE)

(72) Inventors: Murat Ozbas, Penfield, NY (US); Imre Knausz, Fairport, NY (US); Ronald S. Cok, Rochester, NY (US)

(73) Assignee: X Display Company Technology Limited, Dublin (IE)

( * ) Notice: Subject to any disclaimer, the term of this patent is extended or adjusted under 35 U.S.C. 154(b) by 0 days.

(21) Appl. No.: 17/860,777

(22) Filed: Jul. 8, 2022

(65) Prior Publication Data

US 2024/0013708 A1 Jan. 11, 2024

(51) Int. Cl.
*G09G 3/32* (2016.01)

(52) U.S. Cl.
CPC ........... *G09G 3/32* (2013.01); *G09G 2300/06* (2013.01); *G09G 2310/0275* (2013.01); *G09G 2310/0286* (2013.01); *G09G 2310/0297* (2013.01); *G09G 2320/0233* (2013.01); *G09G 2320/0247* (2013.01)

(58) Field of Classification Search
CPC ................. G09G 3/32; G09G 2300/06; G09G 2310/0275–0297; G09G 2320/0233–0247
USPC .......................................................... 345/691
See application file for complete search history.

(56) References Cited

U.S. PATENT DOCUMENTS

| | | | | |
|---|---|---|---|---|
| 5,550,066 | A | 8/1996 | Tang et al. | |
| 7,622,367 | B1 | 11/2009 | Nuzzo et al. | |
| 8,506,867 | B2 | 8/2013 | Menard | |
| 8,722,458 | B2 | 5/2014 | Rogers et al. | |
| 9,928,771 | B2 | 3/2018 | Cok | |
| 10,360,846 | B2 | 7/2019 | Cok et al. | |
| 10,832,609 | B2 | 11/2020 | Rotzoll et al. | |
| 11,430,375 | B1 | 8/2022 | Meitl et al. | |
| 2010/0265224 | A1* | 10/2010 | Cok | B32B 37/12 345/206 |
| 2016/0093600 | A1 | 3/2016 | Bower et al. | |
| 2016/0314761 | A1* | 10/2016 | Kim | G09G 5/10 |
| 2018/0075817 | A1* | 3/2018 | Kim | G09G 3/3688 |
| 2018/0190615 | A1* | 7/2018 | Pan | G06F 3/044 |
| 2019/0066575 | A1* | 2/2019 | Song | G09G 3/3208 |
| 2019/0302515 | A1* | 10/2019 | Tan | G02F 1/133504 |
| 2019/0385509 | A1* | 12/2019 | Lu | H10K 59/129 |
| 2020/0074921 | A1* | 3/2020 | Peng | G09G 3/3208 |
| 2020/0294457 | A1* | 9/2020 | Lim | G09G 3/3614 |
| 2021/0304490 | A1* | 9/2021 | Kaplan | G06T 15/205 |
| 2021/0366343 | A1* | 11/2021 | Oh | G09G 3/3291 |
| 2022/0122519 | A1 | 4/2022 | Bower et al. | |

(Continued)

*Primary Examiner* — Calvin C Ma
(74) *Attorney, Agent, or Firm* — Choate, Hall & Stewart LLP; Michael D. Schmitt

(57) ABSTRACT

A passive-matrix controller provides a control signal to each column of multiple columns of components, a driver for each column wire, and a multiplexer. Each column of components is connected to a column wire. The driver provides a drive signal in response to the control signal and the multiplexer comprises an output connected to each column wire and an input connected to each driver and connects the inputs to the outputs in response to a multiplex signal from the passive-matrix controller. The components can be inorganic micro-light-emitting diodes.

25 Claims, 9 Drawing Sheets

(56) References Cited

U.S. PATENT DOCUMENTS

| | | | |
|---|---|---|---|
| 2022/0122520 | A1 | 4/2022 | Cok et al. |
| 2023/0037480 | A1 | 2/2023 | Ozbas et al. |
| 2023/0055746 | A1 | 2/2023 | Ozbas et al. |

* cited by examiner

| | $I_0$ | $I_1$ |
|---|---|---|
| Mode 0 | $O_0$ | $O_1$ |
| Mode 1 | $O_1$ | $O_0$ |

| | $I_0$ | $I_1$ | $I_2$ | $I_3$ |
|---|---|---|---|---|
| Mode 0 | $O_0$ | $O_1$ | $O_2$ | $O_3$ |
| Mode 1 | $O_3$ | $O_0$ | $O_1$ | $O_2$ |
| Mode 2 | $O_2$ | $O_3$ | $O_0$ | $O_1$ |
| Mode 3 | $O_1$ | $O_2$ | $O_3$ | $O_0$ |

MULTIPLEXED COLUMN DRIVERS FOR PASSIVE-MATRIX CONTROL

FIELD OF THE DISCLOSURE

The present disclosure relates to passive-matrix display architectures having row and column control signals.

BACKGROUND OF THE DISCLOSURE

Flat-panel displays are widely used in conjunction with computing devices, in portable electronic devices, and for entertainment devices such as televisions. Such displays typically employ an array of pixels distributed over a display substrate to display images, graphics, or text. In a color display, each pixel includes light emitters that emit light of different colors, such as red, green, and blue. For example, liquid crystal displays (LCDs) employ liquid crystals to block or transmit light from a backlight behind the liquid crystals and organic light-emitting diode (OLED) displays rely on passing current through a layer of organic material that glows in response to the current. Displays using inorganic light-emitting diodes (LEDs) as pixel elements are also in widespread use for outdoor signage and have been demonstrated in a 55-inch television.

Displays are typically controlled with either a passive-matrix (PM) control scheme employing electronic pixel control circuitry external to the pixel array or an active-matrix (AM) control scheme employing electronic pixel control circuitry in each pixel on the display substrate and associated with each light-emitting element. Both OLED displays and LCDs using passive-matrix control and active-matrix control are available. An example of such an AM OLED display device is disclosed in U.S. Pat. No. 5,550,066. In a PM-controlled display, each pixel in a row is stimulated to emit light at the same time while the other rows do not emit light, and each row is sequentially activated at a high rate to provide the illusion that all of the rows simultaneously emit light. In contrast, in an AM-controlled display, pixel data is concurrently provided to and stored in pixels in a row and the rows are sequentially activated to load the data in the activated row. While data is loaded into one row, the other rows of pixels can emit light corresponding to the pixel data stored in the pixels.

Displays are typically controlled by a display controller that can include or communicate with a column controller for providing column-data signals to columns of pixels and a row controller for providing row-select signal to rows of pixels. The row and column controllers are generally provided in integrated circuits constructed on a semiconductor substrate. Although the construction of semiconductor wafers is carefully controlled, the semiconductor epitaxy, the semiconductor material in which circuits are formed, does vary spatially over the extent of the semiconductor substrate. Moreover, as circuits, components, or devices shrink (become smaller) in size, the variation between the circuits, components, or devices increases, because the area of the circuits, components, or devices decreases so that local changes in epitaxy have a relative larger effect in the smaller circuit, component, or device (e.g., as described with Pelgrom scaling). This variation consequently leads to variable circuit operation. In particular, analog circuits that provide variable voltages and currents can experience considerable performance variation.

SUMMARY

When applied to rows or columns of light emitters, the variation in voltage and current between rows or columns controlled by different circuits can lead to a visible non-uniformity in light output between different rows or columns of light emitters controlled by the circuit with a common control signal. The human visual system is very sensitive to such variation, so there is an on-going need for improvements in light emitter control in passive-matrix systems. The present disclosure addresses this ongoing need by providing embodiments of a controller that includes a multiplexer. The controller can be used in a passive-matrix display design. The multiplexer can act to physically and/or temporally reroute signals so that the observable variation is reduced as compared to a similar design that does not use the multiplexer.

The present disclosure includes, among various embodiments, a passive-matrix controller for providing a control signal to each column of multiple columns of components, each column of components connected to an individual column wire. Each component comprises a column driver for each column wire, the column driver providing a drive signal in response to the control signal, and a multiplexer comprising an output connected to each column wire and an input connected to each column driver. The multiplexer uniquely connects each input to an output in response to a multiplexer control signal provided by the passive-matrix controller that specifies multiplexer connections between the inputs and the outputs to provide each drive signal to an output. The column drivers can each drive a column of pixels or light emitters in a display, for example a passive-matrix display, or the column drivers can be cluster column drivers that can each drive a column of pixels or light emitters in a cluster of pixels in a display.

In some embodiments, a passive-matrix controller for providing a signal to each column of columns of components, each of the columns of components connected to an individual column wire, the controller comprises column drivers, one for each column wire individually connected to one of the columns of components, each of the column drivers providing a drive signal in response to a control signal; and a multiplexer comprising outputs and inputs, each of the outputs connectable to the column wire individually connected to one of the columns of components and each of the inputs connected to one of the column drivers. The multiplexer can be operable to uniquely connect each of the inputs to one of the outputs in response to a multiplexer control signal provided by the passive-matrix controller to provide the drive signal from one of the column drivers to one of the outputs.

In some embodiments, the control signals are analog signals. The analog control signals can be voltage signals or current signals. In some embodiments, the control signals are digital signals. The digital control signals can be data signals, timing signals, or pulse-width modulation signals.

Embodiments of the passive-matrix controller can comprise a first input, a second input, a first output, and a second output. During a first time period the column multiplexer can connect the first input to the first output and the second input to the second output and during a second time period the column multiplexer can connect the first input to the second output and the second input to the first output. In some embodiments, the inputs comprise a first input and a second input and the outputs comprise a first output and a second output, and the multiplexer is operable to connect (i) the first input to the first output and the second input to the second output during a first time period and (ii) the first input to the second output and the second input to the first output during a second time period.

Some embodiments comprise connection pairs of column drivers, each connection pair comprising a first input, a second input, a first output, and a second output and during a first time period the multiplexer connects the first input to the first output and the second input to the second output of each connection pair and during a second time period the multiplexer connects the first input to the second output and the second input to the first output of each connection pair. In some embodiments, each of the connection pairs comprises a first input and a second input of the inputs and a first output and a second output of the outputs, and, for each of the connection pairs, the multiplexer is operable to connect (i) the first input to the first output and the second input to the second output during the first time period and (ii) the first input to the second output and the second input to the first output during a second time period.

Some embodiments of the present disclosure comprise an integrated circuit substrate. The column drivers of the first and second connection pairs can be constructed on and spatially distributed over the integrated circuit substrate and can comprise a first connection pair and a second connection pair. In some embodiments, connection pairs comprise a first connection pair and a second connection pair and the column driver corresponding to the first connection pair and the column driver corresponding to the second connection pairs are constructed on and spatially distributed over the integrated circuit substrate. The column drivers can comprise a first column driver connected to the first input of the first connection pair, a second column driver connected to the second input of the first connection pair, a third column driver connected to the first input of the second connection pair, and a fourth column driver connected to the second input of the second connection pair. The third column driver can be spatially disposed between the first column driver and the second cluster column driver, the fourth column driver can be spatially disposed between the first column driver and the second column driver, or both the third column driver and the fourth column driver can be spatially disposed between the first column driver and the second column driver.

In some embodiments, the first time period has a first temporal duration, the second time period has a second temporal duration, and the first temporal duration and the second temporal duration are equal so that the first and second time periods have an equal temporal duration. In some embodiments, the first time period has a first temporal duration, the second time period has a second temporal duration, and the first temporal duration and the second temporal duration are not equal so that the first and second time periods have different temporal durations.

According to some embodiments of the present disclosure, components include light emitters (e.g., each component is a pixel), for example light-emitting diodes such as inorganic light-emitting diodes or inorganic micro-light-emitting diodes. Each of the inorganic micro-light-emitting-diodes can have a length and a width each no greater than one hundred microns (e.g., no greater than fifty, twenty, ten, or five microns) and a thickness no greater than 50 microns (e.g., no greater than twenty, ten, five, two, or one micron).

The multiple columns of components can comprise a first column of light emitters (e.g., comprised in pixels in the column) having a first average luminance and a second column of light emitters (e.g., comprised in pixels in the column) having a second average luminance that is different from the first average luminance and a ratio of the first temporal duration to the second temporal duration can depend on a ratio of the first average luminance to the second average luminance. In some embodiments, a first column of light emitters (e.g., comprised in pixels in the column) having a first average luminance is connected to one of the first output and the second output and a second column of light emitters (e.g., comprised in pixels in the column) having a second average luminance that is different from the first average luminance is connected to the other of the first output and the second output, and wherein a ratio of a temporal duration of the first time period to a temporal duration of the second time period depends on a ratio of the first average luminance to the second average luminance.

In some embodiments, the inputs comprise N inputs, the outputs comprise N outputs and during each of N time periods each of the N inputs is uniquely connected to each of the N outputs in response to the multiplexer control signal and the connections between the N inputs and the N outputs are different during each of the N time periods. Some embodiments comprise one or more groups of M column drivers, M<=N. Each of the groups of M column drivers can provide drive signals to M inputs of the column multiplexer. During each of M time periods the column multiplexer uniquely connects each of the M inputs to each of the M outputs for each group and the connection between the M inputs and the M outputs for each of the M time periods is different. Each of the inputs can be a member of a group and each of the outputs can be a member of a group.

The column drivers are constructed on and spatially distributed over the integrated circuit substrate. Each group of M column drivers comprises a column driver connected to each of the M inputs and one or more column drivers of a group are disposed spatially between the column drivers of another, different group.

In embodiments of the present disclosure, the N time periods have an equal temporal duration. In embodiments of the present disclosure, at least some of the N time periods have different temporal durations. In some embodiments, the multiple columns of components comprise N columns of light emitters (e.g., comprised in pixels in the columns), each of the columns of light emitters have an average luminance, and the temporal duration of each of the N time periods depends on the relative average luminance of the N columns of light emitters.

Embodiments of the present disclosure comprise an integrated circuit substrate having variable epitaxy. The performance of circuits made in the variable epitaxy can vary so that at least some of the column drivers have at least some different electrical characteristics. The column drivers are disposed in the integrated circuit and at least some different electrical characteristics of the column drivers are dependent on the spatial location of the corresponding column drivers within the integrated circuit.

In some embodiments, a passive-matrix display comprises components that each include one or more light emitters, for example each component is a pixel with one light emitter or with multiple light emitters (e.g., a set of red, green, and blue emitters). In some embodiments, the light emitters are light-emitting diodes. The light-emitting diodes can be inorganic micro-light-emitting-diodes and each of the inorganic micro-light-emitting-diodes can have a length and a width each no greater than one hundred microns (e.g., no greater than fifty, twenty, ten, or five microns) and a thickness no greater than 50 microns (e.g., no greater than twenty, ten, five, two, or one micron).

A passive-matrix display can comprise two or more columns of pixels and a cluster column driver providing a drive signal to each column of the two or more columns of pixels. Each of the column drivers can be operable to drive each column of pixels of the two or more columns of pixels with a drive signal during a frame period.

Each of the pixels can comprise one or more inorganic micro-light-emitting-diodes, for example three LEDs in a color pixel. Each of the inorganic micro-light-emitting-diodes can have a length and a width each no greater than 200 microns, no greater than 100 microns, no greater than 50 microns, no greater than 20 microns, no greater than 215 microns, or no greater than 10 microns.

According to embodiments of the present disclosure, a method for controlling components that are disposed in columns comprises providing a controller that comprises column drivers, one for each of the columns, and a multiplexer comprising outputs and inputs, each of the inputs connected to one of the column drivers and each of the outputs connected to one of the columns of the components, uniquely connecting each of the inputs to one of the outputs in response to a multiplexer control signal and, for each of the column drivers, providing a drive signal from the column driver to a respective one of the columns of components. The inputs can comprise a first input and a second input and the outputs can comprise a first output and a second output. The method can comprise connecting the first input to the first output and the second input to the second output during a first time period and subsequently connecting the first input to the second output and the second input to the first output during a second time period.

In some embodiments, the first time period has a first temporal duration, the second time period has a second temporal duration, and the first temporal duration and the second temporal duration are equal. In some embodiments, the first time period has a first temporal duration, the second time period has a second temporal duration, and the first temporal duration and the second temporal duration are not equal.

In some embodiments, a first column of light emitters having a first average luminance is connected to one of the first output and the second output and a second column of light emitters having a second average luminance that is different from the first average luminance is connected to the other of the first output and the second output, and a ratio of a temporal duration of the first time period to a temporal duration of the second time period is based on a ratio of the first average luminance to the second average luminance.

In some embodiments, the inputs and the outputs are together grouped as connection pairs, each of the connection pairs comprises a first input and a second input of the inputs and a first output and a second output of the outputs, and methods of the present disclosure can comprise, for each of the connection pairs, (i) connecting the first input to the first output and the second input to the second output during the first time period and (ii) subsequently connecting the first input to the second output and the second input to the first output during a second time period.

In some embodiments, the column drivers are native to and spatially distributed over an integrated circuit substrate.

Methods of the present disclosure comprise connecting different ones of the column drivers, one at a time, to one of the columns of components with the multiplexer and providing a drive signal from each of the different ones of the column drivers to the components in the one of the columns when connected by the multiplexer. The period of time can be a frame period. The different ones of the column drivers can comprise each of the column drivers.

Some embodiments comprise simultaneously connecting adjacent ones of the column drivers to non-adjacent ones of the columns of the components with the multiplexer. Some embodiments comprise providing drive signals from the adjacent ones of the column drivers to the non-adjacent ones of the columns of the components while simultaneously connected. Some embodiments comprise simultaneously connecting non-adjacent ones of the column drivers to adjacent ones of the columns of the components with the multiplexer. Some embodiments comprise providing drive signals from the non-adjacent ones of the column drivers to the adjacent ones of the columns of the components while simultaneously connected.

In some embodiments, the inputs comprise N inputs, the outputs comprise N outputs and methods of the present disclosure comprise, during each of N time periods, uniquely connecting each of the N inputs to each of the N outputs in response to a multiplexer control signal with different connections between the N inputs and the N outputs during each of the N time periods. The N time periods can have an equal temporal duration. In some embodiments, at least some of the N time periods have different temporal durations from each other.

In some embodiments, the columns of components comprise N columns of light emitters, each of the columns of light emitters having an average luminance, and a temporal duration of each of the N time periods is based on a relative average luminance of the N columns of light emitters. In some embodiments, the components are also disposed in rows thereby defining a two dimensional array, and methods of the present disclosure comprise providing row select signals sequentially to the rows of the components and operating the components in each of the rows when that row is selected by one of the row select signals.

The components can be light emitters and operating the components can comprise emitting light from the light emitters. The components can be comprised in one cluster of a plurality of clusters in a device.

According to embodiments of the present disclosure, the device is a display.

Embodiments and methods of the present disclosure provide passive display control methods, devices, and structures that provide improved control uniformity.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
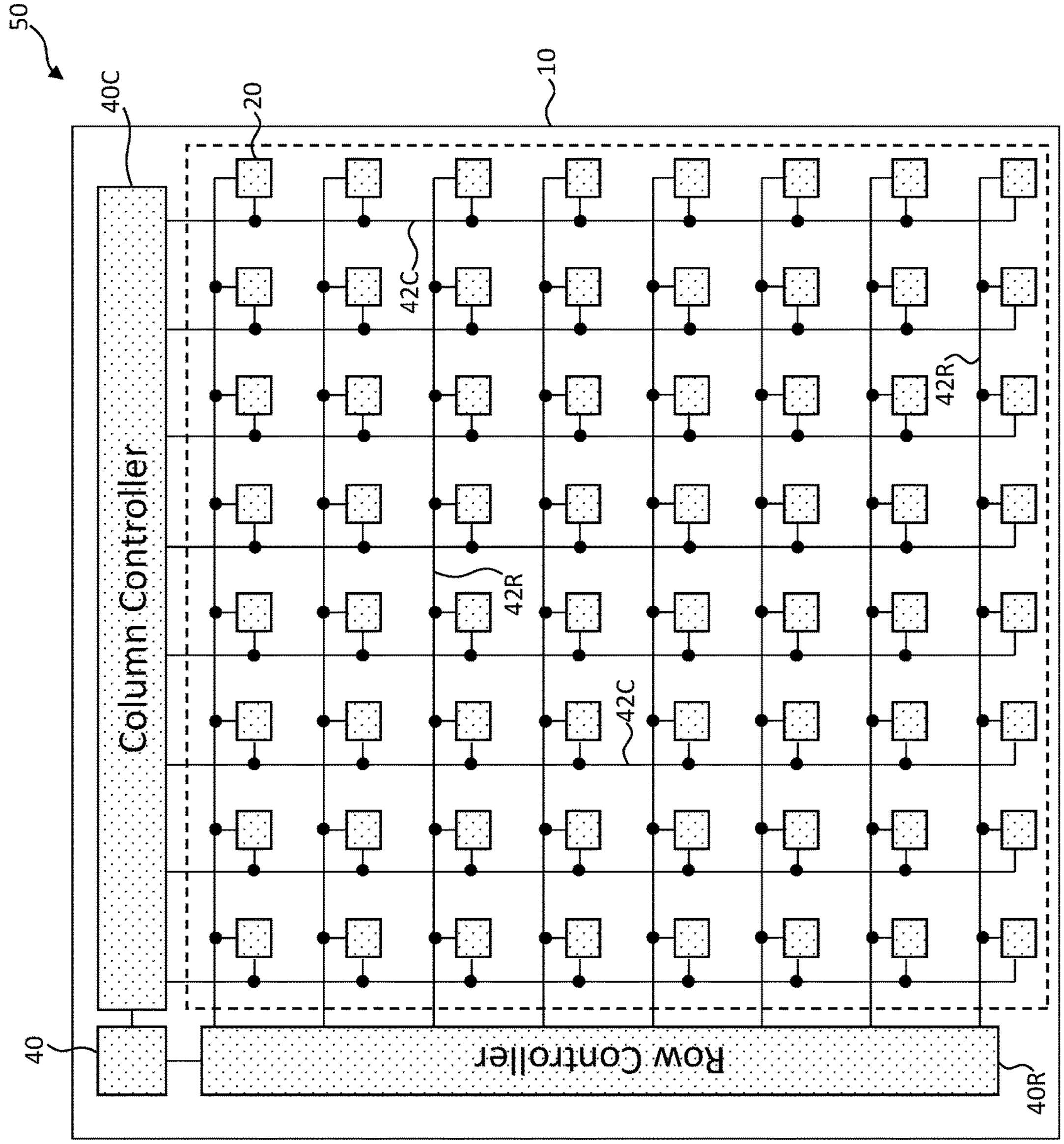
FIG. 1 is a schematic of a display according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

Integrated circuits, for example integrated circuits used to construct driver circuits for passive-matrix control of rows or columns of light emitters in a display, are often formed in a semiconductor epitaxy—a layer of semiconductor material disposed on a crystalline substrate in which the passive-matrix driver circuits are formed. Ideally, the epitaxy would be perfect, without crystal defects, particulate contamination, or variations in thickness or doping. In manufacturing practice, however, the epitaxy varies over the extent of a semiconductor wafer. The epitaxial variation affects the performance of circuits photolithographically formed in the epitaxy, which can therefore be dependent on the spatial location of the circuit on the semiconductor wafer. For example, circuits formed in different portions of a semiconductor wafer can have different speeds, different efficiencies, different conductivities, different switching voltages, and so on. In particular, driver circuits made in different areas of an integrated circuit can drive different amounts of current, different voltages, different switching voltages, or at different frequencies even when controlled with the same control signals. In a passive-matrix display with a column-driver circuit for each column of light emitters (e.g., inorganic light-emitting diodes), the variation in performance of column-driver circuit formed in different spatial portions of epitaxy in an integrated circuit can cause visual defects and non-uniformities in the columns of light emitters in the display.

Embodiments of the present disclosure provide, inter alia, passive-matrix display control methods and architectures that reduce performance non-uniformity in passive-matrix displays due to variation in driver circuit epitaxy in an integrated circuit. The components can be pixels that comprise one or more light emitters. The one or more light emitters can be one or more inorganic light-emitting diodes, for example one or more micro-light-emitting diodes. A driver circuit responds to control signals to provide a current or a voltage for a specified period of time to a wire connected to one or more pixels in a row or column. The control signals can be analog signals, e.g., controlling a variable current or voltage for the specified period of time, or a digital signal, e.g., providing a fixed current or voltage or no voltage or current for the specified period of time, for example data signals such as pixel data signals, timing signals, or pulse-width modulation signals. Components in a column (e.g., and also in a row) can include one or more light emitters, for example can be pixels that each include one light emitter or multiple light emitters (e.g., a set of red, green, and blue emitters). Components can be disposed in an array (e.g., regular array) having columns and rows.

Embodiments of the present disclosure are described with respect to column drivers and columns of components but the choice of which direction is the "column" direction is arbitrary. Therefore, reference herein to columns and/or column drivers does not necessarily imply any particular orientation (e.g., vertical); columns can be oriented left to right or right to left, for example. Column drivers can be display column drivers that drive entire columns of components (e.g., pixels or light emitters) (e.g., in a display), or column drivers can be cluster column drivers that drive entire columns of components (e.g., pixels or light emitters) in a cluster of a component array (e.g., in a display). That is, description of column drivers as driving Cluster column drivers are considered as particular embodiments of column drivers.

According to some embodiments of the present disclosure and as illustrated in FIG. 1, display 50, e.g., a flat-panel display 50, comprises a display substrate 10 and pixel clusters 20 distributed in an array comprising rows and columns of pixel clusters 20 over display substrate 10. Pixel clusters 20 can be, but are not necessarily, spatially separate and non-overlapping so that nothing in a pixel cluster 20 is disposed spatially within an area of display substrate 10 that includes another, different pixel cluster 20. Display 50 can be controlled by a display controller 40 and can be connected to, control, or comprise a display column controller 40C and a display row controller 40R and can provide display control signals to the array of pixel clusters 20. Display column controller 40C can provide display column signals (e.g., display column-data signals) to pixel clusters 20 through display column wires 42C. Each display column wire 42C uniquely connects to each pixel cluster 20 in a column of pixel clusters 20 in display 50 and uniquely provides control signals to the connected column. Display row controller 40R can provide display row signals (e.g., display row-select signals) to pixel clusters 20 through display row wires 42R. Each display row wire 42R uniquely connects to each pixel cluster 20 in a row of pixel clusters 20 in display 50 and uniquely provides control signals to the connected row. Display controller 40, display row controller 40R, and display column controller 40C can provide active-matrix control to pixel clusters 20.

FIG. 1 illustrates a display controller 40 controlling an array of pixel clusters 20 with active-matrix control signals such as row-select signals provided on display row wires 42R and column-data signals provided on display column wires 42C, for example using display row controller 40R and display column controller 40C. Although the Figures illustrate such an active-matrix control method and structure for pixel clusters 20, embodiments of the present disclosure are not limited to such a control technique. For example, pixel clusters 20 can be controlled using active-matrix signals provided through token-passing structures or direct connection to each pixel cluster 20, for example as disclosed in U.S. patent application Ser. No. 17/074,596, filed on Oct. 19, 2020, U.S. patent application Ser. No. 17/074,600, filed on Oct. 19, 2020, and U.S. patent application Ser. No. 17/553,304, filed on Dec. 16, 2021, the disclosure of each of which is hereby incorporated by reference herein in its entirety.

Figure 2:
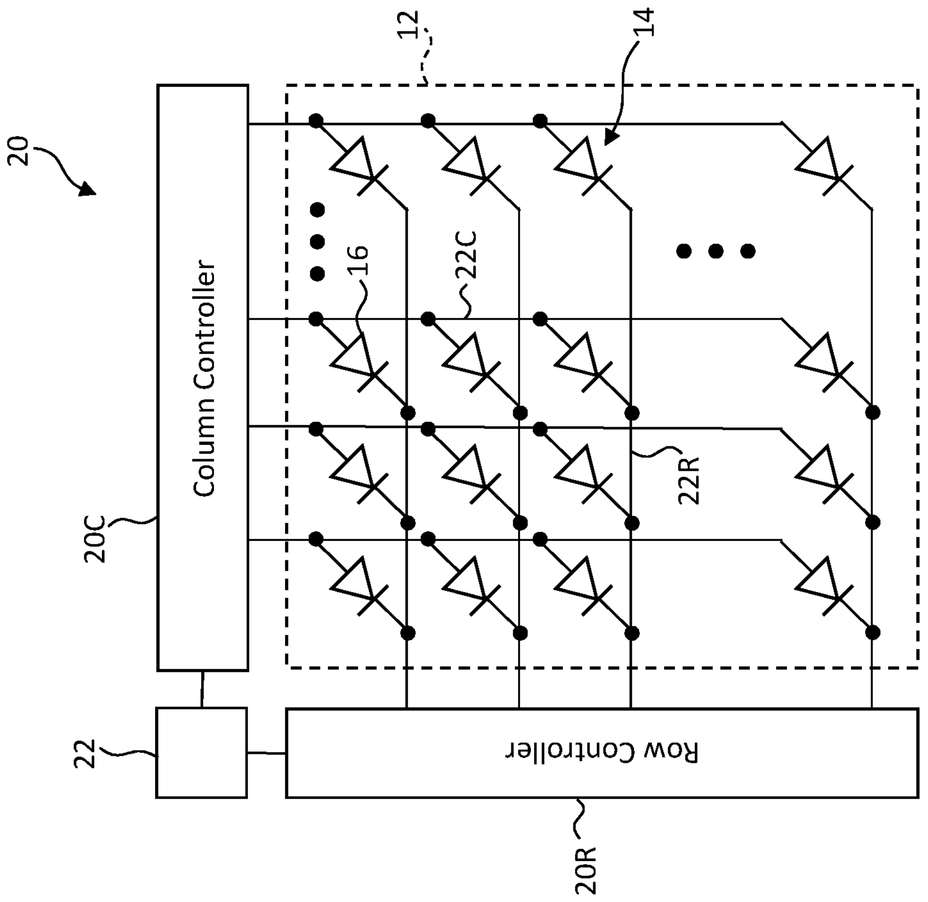
FIG. 2 is a schematic of a pixel cluster in a display comprising light-emitting diodes in a passive-matrix configuration according to illustrative embodiments of the present disclosure.

As shown in FIG. 2, each pixel cluster 20 can comprise an array 12 of components 14 (e.g., pixels 14) controlled by cluster controller 22. Pixels 14 can comprise a light emitter 16 (e.g., a light-emitting diode, such as an inorganic micro-light-emitting diode, or multiple light emitters 16 (e.g., multiple light emitters 16 that emit different colors of light). Light emitters 16 in pixel clusters 20 can define an array 12 in a display area of display substrate 10. Light emitters 16 can be connected by cluster row wires 22R and cluster column wires 22C in pixel cluster 20 on display substrate 10 or on a separate cluster substrate (not shown). Pixels 14 can comprise a red light emitter emitting red light, a green light emitter emitting green light, and a blue light emitter emitting blue light when provided with pixel data and suitable control, power, and ground signals from cluster controller 22 forming a picture element or pixel 14 in pixel clusters 20 of display 50. Cluster controller 22 can comprise, control, or is connected to cluster row controller 20R and cluster column controller 20C that provide control signals (timing signals or pixel data) to cluster row wires 22R and cluster column wires 22C and to pixels 14. If pixels 14 comprise red, green, and blue light emitters 16, each color of light emitter 16 can be connected to separate cluster row wires 22R and cluster column wires 22C connected to cluster row controller 20R and cluster column controller 20C. Pixel data can specify the light output from pixels 14 with digital values, for example using pulse-width modulation (PWM), or with analog values such as variable currents or voltages. Pixels 14 in each pixel cluster 20 can be adjacent so that no pixel 14 from any other pixel cluster 20 is spatially disposed between pixels 14 in pixel cluster 20. Pixel clusters 20 can be arranged with pixels 14 disposed in a regular array 12 with a cluster controller 22 disposed between rows or columns of pixels 14 in a pixel cluster 20 or between pixel clusters 20. Such an arrangement of pixel clusters 20, light emitters 16, and cluster controllers 22 has been successfully laid out for a display 50 on a display substrate 10.

Embodiments of the present disclosure can also be applied to cluster row controllers 20R or display row controllers 40R where the drive signals vary according to the spatial arrangement of cluster row controllers 20R or display row controllers 40R in an integrated circuit, for example integrated circuits formed in a crystalline semiconductor (e.g., silicon) substrate. As will be appreciated by those knowledgeable in the art, row and column designations are arbitrary and can be exchanged.

FIG. 2 illustrates a cluster controller 22 controlling an array 12 of pixels 14 in each pixel cluster 20 with passive-matrix control signals provided on cluster row wires 22R and cluster column wires 22C. Thus, in some embodiments, display controller 40 provides active-matrix control to pixel clusters 20 and pixel clusters 20 provide passive-matrix control to pixels 14 (e.g., light emitters 16 such as inorganic micro-light-emitting diodes). In some embodiments, FIG. 2 can illustrate an entire passive-matrix display 50 without separately controlled pixels clusters 20 so that cluster controller 22, cluster column controller 20C, cluster row controller 20R, cluster column wires 22C, and cluster row wires 22R are equivalently display controller 40, display column controller 40C, display row controller 40R, display column wires 42C, and display row wires 42R, respectively. Thus, embodiments of the present disclosure can be applied to entire displays 50 without pixel clusters 20 rather than to pixel clusters 20 within a display 50.

Figure 3:
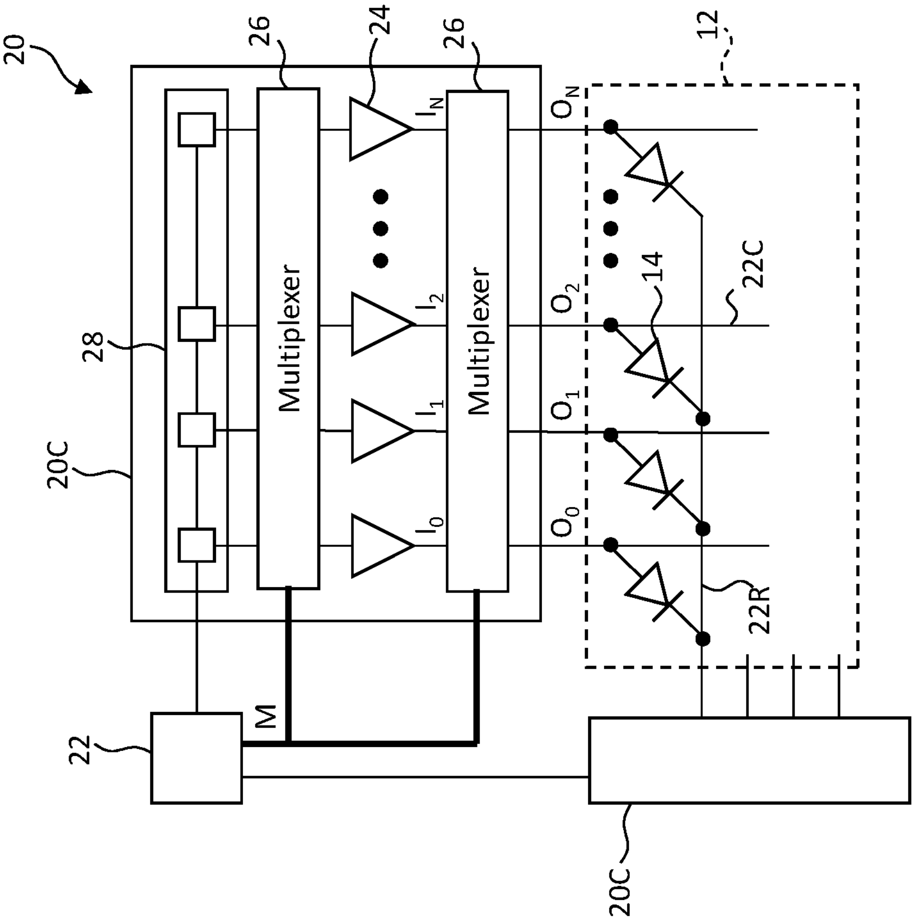
FIG. 3 is a schematic of a cluster controller with multiplexed column drivers and a row of light-emitting diodes according to illustrative embodiments of the present disclosure.

FIG. 3 illustrates embodiments of passive-matrix controllers of the present disclosure for both a pixel cluster 20 and display 50. Pixel cluster 20 includes a cluster controller 22 that can comprise cluster column controller 20C as well as cluster row controller 20R for controlling an array 12 of pixels 14 (e.g., light emitters 16) connected in rows and columns by cluster row wires 22R and cluster column wires 22C, respectively. (For brevity, only one row of light emitters 16 is shown in array 12 of light emitters 16. Embodiments of the present disclosure are illustrated with a four-by-four array 12 of light emitters 16, but embodiments are not limited to such and can comprise any array 12 size, generally with at least two columns of light emitters 16.) Cluster controller 22 can, but does not necessarily, comprise a column shift register 28 for providing pixel data received from cluster controller 22 to each cluster column wire 22C specifying the desired luminance of each light emitter 16 in a row of light emitters 16 selected by cluster row controller 20R on cluster row wires 22R. Column shift register 28 can comprise a digital serial shift register for shifting digital pixel data or can comprise an analog serial shift register for shifting analog pixel data comprising capacitors for storing charge (e.g., a bucket brigade). The pixel data for each column of light emitters 16 are provided to cluster column drivers 24 that transform the pixel data to a pixel control signal input to column multiplexer 26, for example a current or voltage, labeled $I_0$ to $I_N$ for an (N+1)-column array 12 of light emitters 16. The multiplexer input signals I are then multiplexed by column multiplexer 26 in response to multiplexer control signal M from cluster controller 22 to corresponding multiplexer output signals $O_0$ to $O_N$ on cluster column wires 22C that drive light emitters 16 in each column of a row of light emitters 16 selected by cluster row controller 20R on cluster row wires 22R to emit light in response to the pixel data provided by cluster controller 22. A similar column multiplexer 26 can be provided to supply corresponding pixel data to each drive circuit 24 in response to mode M, as shown in FIG. 3.

Figure 4:
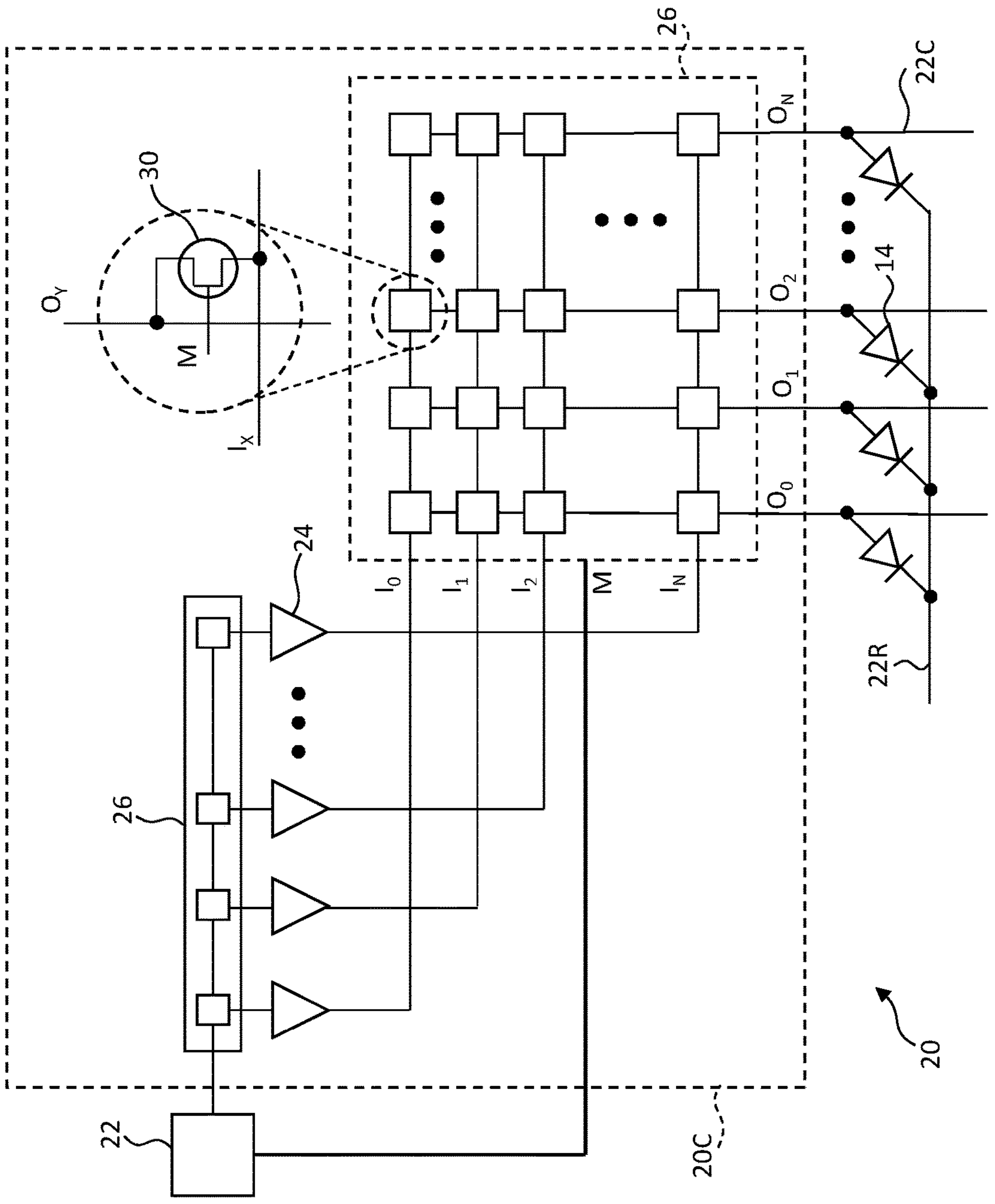
FIG. 4 is a schematic of a cluster controller with multiplexed column drivers and a row of light-emitting diodes according to illustrative embodiments of the present disclosure.

FIG. 4 is a more detailed illustration of the circuit of FIG. 3. As shown in FIG. 4, column multiplexer 26 can comprise a cross-point switch that connects multiplexer input signals $I_0$ to $I_N$ to multiplexer output signals $O_0$ to $O_N$, for example with a transistor switch 30. In embodiments of the present disclosure, the cross-point switch does not need to connect every multiplexer input I to every multiplexer output O depending on multiplexer control signal M but only needs to uniquely connect each multiplexer input I to a multiplexer output O so that no multiplexer output O is connected to more than one multiplexer input I at a time. (Pixel cluster 20 as illustrated in FIGS. 3 and 4 is a simplified schematic and does not necessarily include all of the logic circuits used to actually implement the desired functionality; those of ordinary skill in the art will understand how to implement any such logic circuits.)

In embodiments of the present disclosure, the different cluster column drivers 24 can be constructed in an integrated circuit that has spatially variable epitaxy so that the different cluster column drivers 24, made in different spatial portions of the integrated circuit, have different performance characteristics. For example, if cluster column drivers 24 are disposed in the integrated circuit in a row so that cluster column driver 24 for $I_0$ is spatially farthest from cluster column driver 24 for $I_N$, those cluster column drivers 24 $I_0$ and $I_N$ can be the most different in performance. According to embodiments of the present disclosure, those differences can be mitigated by using each cluster column driver 24 to drive each cluster column wire 22C at a different time with the same pixel data. If each cluster column wire 22C is driven for an (e.g., equal) amount of time with the same signal for each cluster column driver 24, the output on each cluster column wire 22C will be the temporal average of the output from each cluster column driver 24. If the amounts of time are small enough, a human observer will not observe any temporal flickering due to the different performances of each cluster column driver 24 in a column of pixels 14.

Figures 5A, 5B:
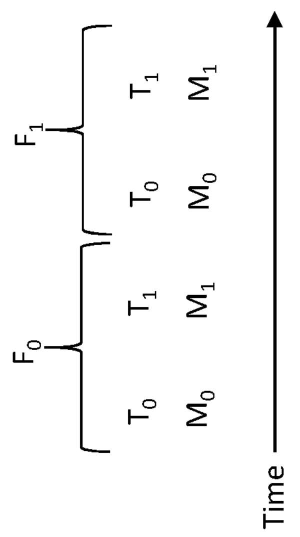
FIG. 5A is a table showing timing for a two-column multiplexed column driver circuit according to illustrative embodiments of the present disclosure.
FIG. 5B is a table showing input and output connections for two-column column-driver modes according to illustrative embodiments of the present disclosure.

For example, and as illustrated in FIG. 5A for a two-column array 12 of light emitters 16, a first image frame (a first image comprising pixel data) is displayed for a frame period of time $F_0$ and a second image frame (second image comprising pixel data) is displayed for a frame period of time $F_1$. A frame period F is a temporal period during which display 50 (or a cluster 20) is intended to display a single, unchanging image. Each frame period of time F is divided into a number of temporal periods T (e.g., temporal periods $T_0$ and $T_1$) corresponding to the number of columns of light emitters 16. Frame periods $F_0$ and $F_1$ can be equal. As shown in FIGS. 5A and 5B, during temporal period $T_0$ column multiplexer 26 operates in Mode 0 ($M_0$) to connect $I_0$ to $O_0$ and $I_1$ to $O_1$. During temporal period $T_1$ column multiplexer 26 operates in Mode 0 ($M_0$) to connect $I_0$ to $O_1$ and $I_1$ to $O_0$. The mode signals $M_0$ to $M_{N-1}$ (where N=2, the number of columns in this example) are collectively referred to as multiplexer control signal M. Thus, according to embodiments of the present disclosure, a passive-matrix controller can comprise column multiplexer 26 having first input $I_0$, second input $I_1$, first output $O_0$, and second output $O_1$. During first time temporal period $T_0$, column multiplexer 26 in mode $M_0$ connects first input $I_0$ to first output $O_0$ and second input $I_1$ to second output $O_1$. During second time temporal period $T_1$, column multiplexer 26 in mode $M_1$ connects first input $I_0$ to second output $O_1$ and second input $I_1$ to first output $O_0$.

During each frame period F, each column of light emitters 16 can be driven for one half of frame period F with a first cluster column driver 24 and the other half of frame period F with a second cluster column driver 24 so that any performance differences of the cluster column drivers 24 are averaged out for each column of light emitters 16 over frame period F. If both columns of light emitters 16 are driven with the same control signal, the light output from the columns of light emitters 16 is the same. A suitable frame period can be 1/60 second, or 1/120 second so that $T_0$ and $T_1$ are 1/120 second or 1/240 second, respectively. Such frame rates can be sufficient to avoid visible flickering due to differences in cluster column drivers 24 performance.

Figure 6B:
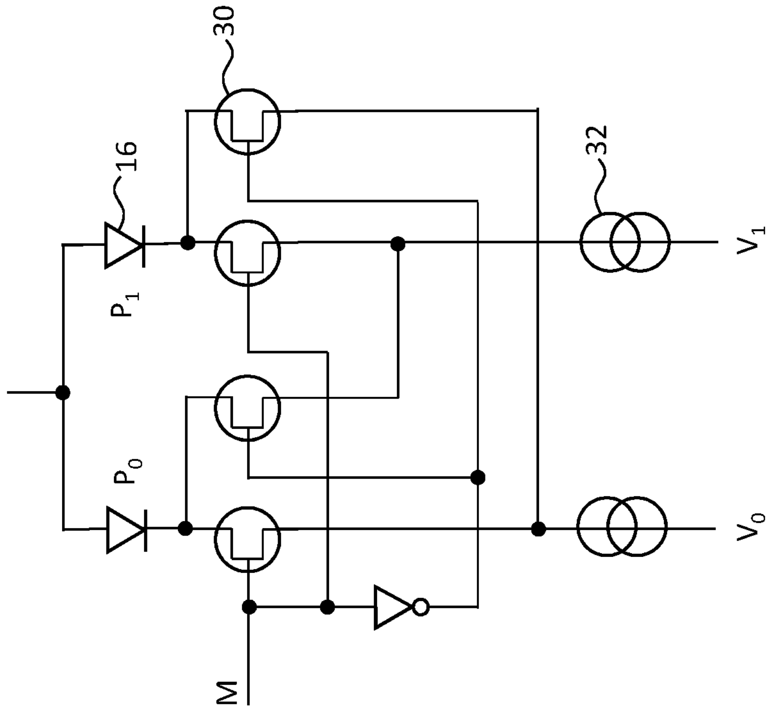
FIG. 6B is a schematic circuit diagram showing input and output connections for two-column column-driver modes of FIGS. 5A and 5B and the logic circuit of FIG. 6A according to illustrative embodiments of the present disclosure.
Figure 6A:
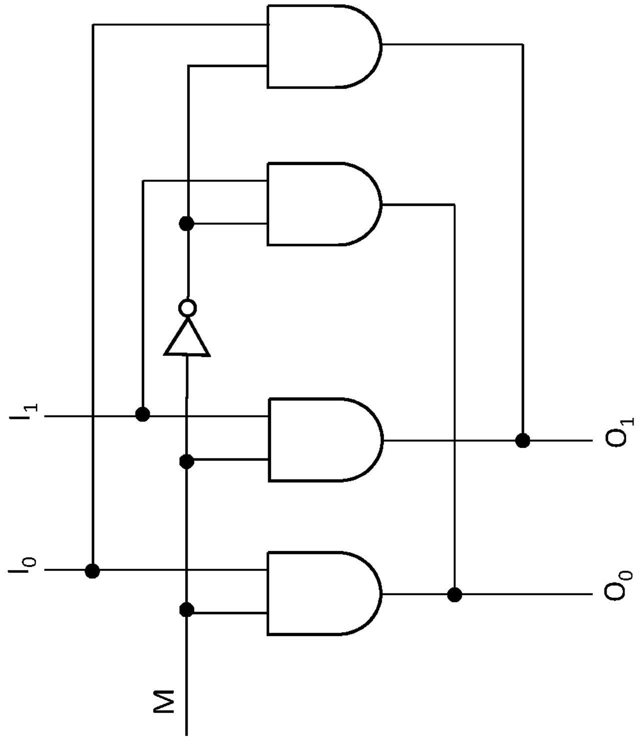
FIG. 6A is a logic circuit for the two-column column-driver modes of FIGS. 5A and according to illustrative embodiments of the present disclosure.

FIG. 6A is a logic diagram illustrating implementations of the embodiments of FIGS. 5A and 5B. As shown in FIG. 6A, a multiplexer (mode) control signal M selects between mode 0 and mode 1 of FIG. 5B using AND gates. When M is positive, $I_0$ is connected to $O_0$ and $I_1$ is connected to $O_1$. When M is negative, $I_0$ is connected to $O_1$ and $I_1$ is connected to $O_0$. Although shown as AND gates (logic gates), the input signals can be analog signals that are switched using an analog switch with a high-impedance output (a tri-state output), for example as shown in FIG. 6B. FIG. 6B illustrates two current sources 32 (or alternatively voltage sources) labeled $V_0$, $V_1$) each controlled by a different pixel data signal. Each of $P_0$ and $P_1$ are driven with a corresponding source $V_0$, $V_1$. When M is positive (e.g., $M_0$), for example during $T_0$ of a frame period, $V_0$ (in response to pixel data for pixel $P_0$) is switched through a transistor switch 30 to $P_0$ and $V_1$ (in response to pixel data for pixel $P_1$) is switched through a transistor switch 30 to $P_1$. (Pixels $P_0$, $P_1$ include light emitters 16.) When M is negative (e.g., $M_1$), for example during $T_1$ of a frame period, $V_0$ (in response to pixel data for pixel $P_1$) is switched through a transistor switch 30 to $P_1$ and $V_1$ (in response to pixel data for pixel $P_0$) is switched through a transistor switch 30 to $P_0$. Thus, the luminance from each pixel $P_0$, $P_1$ for the entire frame period is the average of the driving signal from $V_0$ and $V_1$ so that any differences in performance (non-uniformity) of $V_0$ and $V_1$ are mitigated or entirely removed for each of pixels $P_0$, $P_1$.

Figure 7A:
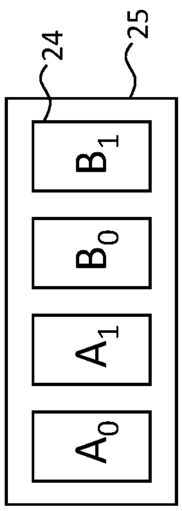
FIGS. 7A-7C illustrate relative spatial locations of cluster column drivers in connection pairs according to illustrative embodiments of the present disclosure.
Figure 7B:
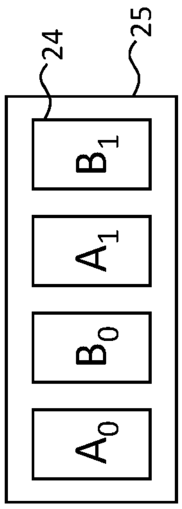
Figure 7C:
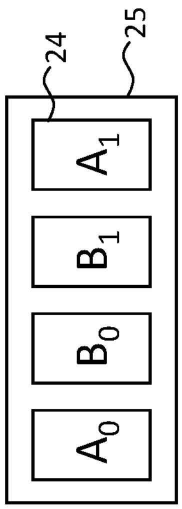

In some embodiments of the present disclosure, cluster column drivers 24 are spatially distributed over an epitaxial area, for example a portion of an integrated circuit. Columns of light emitters 16 can be connection pairs driven by corresponding cluster column drivers 24. Each connection pair can comprise a first input, a second input, a first output, and a second output and (i) during the first time period the multiplexer connects the first input to the first output and the second input to the second output of each connection pair and (ii) during a second time period the multiplexer connects the first input to the second output and the second input to the first output of each connection pair, for example as discussed with respect to FIGS. 5A-6B. In some embodiments of the present disclosure, the spatial location of a cluster column driver 24 in a first connection pair is disposed between the spatial locations of a cluster column driver 24 in a second connection pair so that at least one cluster column driver 24 of the first connection pair is interdigitated between the cluster column drivers 24 of the second connection pair. Assuming that the performance variation of cluster column drivers 24 is monotonic, the average performance of cluster column drivers 24 of the first connection pair is closer to the average performance of cluster column drivers 24 of the second connection pair than would be the case if the cluster column drivers 24 of the first and second connection pairs were not interdigitated. For example and as illustrated in FIGS. 7A-7C, connection pair A has cluster column drivers 24 A0 and A1 and connection pair B has cluster column drivers 24 B0 and B1 disposed on variable-performance epitaxy 25 in the spatial order shown. Arbitrarily assuming that the spatial variation in performance varies monotonically from 2 to 3 to 4 to 5 in the four locations of epitaxy 25, as shown in FIG. 7A connection pair A will have an average performance over a frame period of 2.5 (equal to (2+3)/2) and connection pair B will have an average performance over the frame period of 4.5 (equal to (4+5)/2) for an average cluster column driver 24 performance difference between the connection pairs A and B of 2. In contrast and as shown in FIG. 7B with a cluster column driver 24 of connection pair B disposed between the cluster column drivers 24 of connection pair A, the average performance of connection pair A will be 3 (equal to (2+4)/2) and the average performance of connection pair B will be 4 (equal to (3+5)/2) so that the difference is 1, a value less than 2 and therefore providing better performance uniformity. As shown in FIG. 7C with both cluster column drivers 74 of connection pair B disposed between the cluster column drivers 24 of connection pair A, the average performance of connection pair A will be 3.5 (equal to (2+5)/2) and the average performance of connection pair B will also be 3.5 (equal to (3+4)/2) so that the difference is zero so that the average performance of cluster column drivers 24 of the connection pairs is the same and the performance variation of the epitaxy 25 and cluster column drivers 24 in an integrated circuit is mitigated or reduced.

Thus, according to embodiments of the present disclosure, a passive-matrix controller comprises an integrated circuit substrate on which column drivers for at least two connection pairs are constructed and spatially distributed. A first connection pair comprises first and second cluster column drivers 24 disposed on the integrated circuit substrate and a second connection pair comprises third and fourth cluster column drivers 24 disposed on the integrated circuit substrate. The first cluster column driver 24 can be connected to the first input of the first connection pair and the second cluster column driver 24 can be connected to the second input of the first connection pair. The third cluster column driver 24 can be connected to the first input of the second connection pair and the fourth cluster column driver 24 can be connected to the second input of the second connection pair. The third cluster column driver 24 can be spatially disposed between the first column driver and the second column driver. In some embodiments, the third and fourth cluster column drivers 24 can be spatially disposed between the first cluster column driver 24 and the second cluster column driver 24.

In some embodiments, the first time period has a first temporal duration, the second time period has a second temporal duration, and the first temporal duration and the second temporal duration are equal. However, in some embodiments (e.g., as shown in FIG. 7B), the average performance of different connection pairs (or more generally the average performance of different groups of cluster column drivers 24) can be different. This difference can also be mitigated by controlling the relative duration of the time periods T within an image frame period F. For example, and corresponding to FIG. 7B, if time periods corresponding to B0 and A1 are twice as long as the time periods corresponding to A0 and B1, the average difference is 0.33 rather than 1. Thus, in some embodiments, the first temporal duration and the second temporal duration are not equal. In particular, if components 14 include light emitters 16 such as inorganic light-emitting diodes that emit light in response to control signals, a ratio of the temporal durations of the time periods can correspond to or depend upon the relative luminance of each column of light emitters 16.

Figures 8A, 8B:
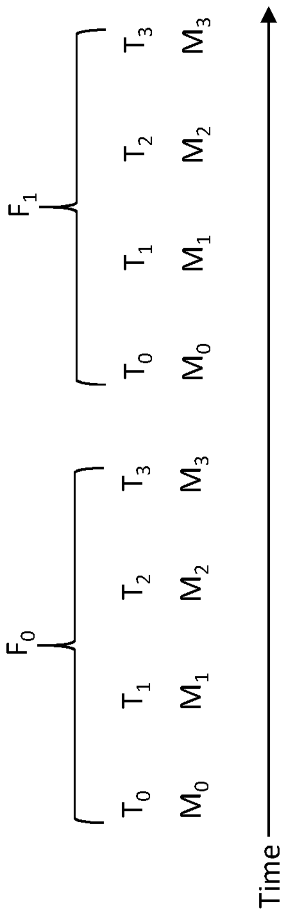
FIG. 8A is a table showing timing for a four-column multiplexed column driver circuit according to illustrative embodiments of the present disclosure.
FIG. 8B is a table showing input and output connections for four-column column-driver modes according to illustrative embodiments of the present disclosure.
Figure 9:
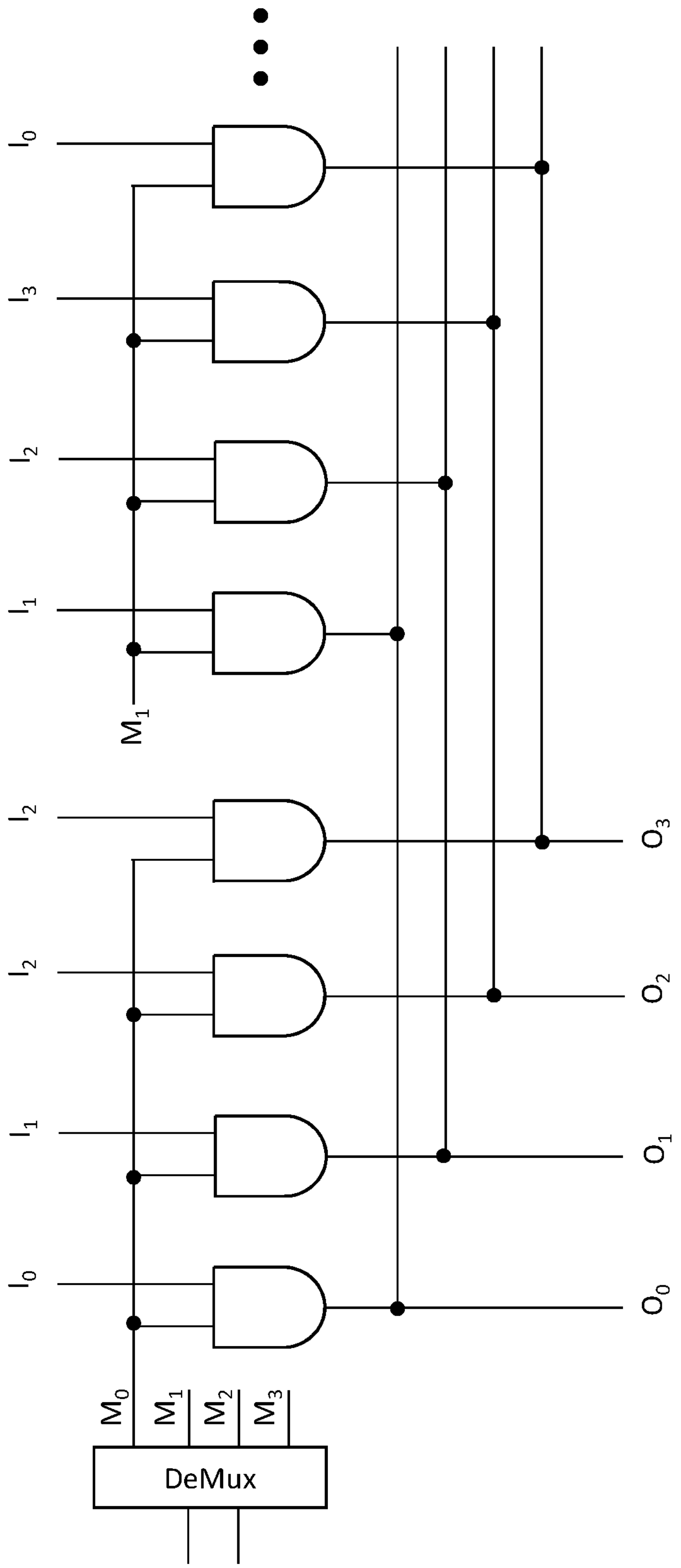
FIG. 9 is a logic circuit for four-column column-driver modes of FIGS. 8A and 8B according to illustrative embodiments of the present disclosure.

The examples of FIGS. 8A, 8B, and 9 are embodiments of the present disclosure with four columns of light emitters 16 in a passive-matrix-controlled array 12. As shown in FIGS. 8A and 8B, during each of sequential frame times $F_0$ and $F_1$, a passive-matrix cluster column controller 20C (or display column controller 40C) can control each of four light emitter 16 columns in each of four sequential time periods T with a different cluster column driver 24 and each of the four light emitter 16 columns is driven with a different cluster column driver 24 in each of the four sequential time periods T corresponding to the number of columns as illustrated with mode 0 ($M_0$), mode 1 ($M_1$), mode 2 ($M_2$), and mode 3 ($M_3$) to connect inputs I to outputs O as shown in FIG. 6B for each of the modes M. Thus, according to methods of the present disclosure, a passive-matrix display 50 or portion of a display 50 (e.g., a pixel cluster 20 of pixels 14 in a display 50) comprises two or more columns of pixels 14 driven by a corresponding two or more cluster column drivers 24 that controls (e.g., drives) each of the columns of pixels 14 with each of the two or more cluster column drivers 24 during a frame period.

FIG. 8A illustrates embodiments with a four-column array 12 of light emitters 16, a first frame (first image comprising pixel data) is displayed for a frame period of time $F_0$, and a second frame (second image comprising pixel data) is displayed for a frame period of time $F_1$. Each frame period of time is divided into four equal sub-periods $T_0$, $T_1$, $T_2$, and $T_3$ corresponding to the number of columns of light emitters 16. Frame periods $F_0$ and $F_1$ can be equal in temporal duration. As shown in FIGS. 6A and 6B, during $T_0$ (Mode 0 or $M_0$), a first column multiplexer 26 connects $I_0$ to $O_0$, $I_1$ to $O_1$, $I_2$ to $O_2$, and $I_3$ to $O_3$. During $T_1$ (Mode 1 or $M_1$), a second column multiplexer 26 connects $I_0$ to $O_3$, $I_1$ to $O_0$, $I_2$ to $O_1$, and $I_3$ to $O_2$. During $T_2$ (Mode 2 or $M_2$), a third column multiplexer 26 connects $I_0$ to $O_2$, $I_1$ to $O_3$, $I_2$ to $O_0$, and $I_3$ to $O_1$. During $T_3$ (Mode 3 or $M_3$), and a fourth column multiplexer 26 connects $I_0$ to $O_1$, $I_1$ to $O_2$, $I_2$ to $O_3$, and $I_3$ to $O_0$. The mode signals $M_{0-4}$ are collectively multiplexer control signal M. Thus, over each frame period F, each column of light emitters 16 is driven for one quarter of the frame period F with each cluster column driver 24 so that the columns of light emitters 16 will emit the same amount of light over the entire frame period F if controlled with the same control signal. A suitable frame period F can be 1/60 second, or 1/120 second so that $T_0$, $T_1$, $T_2$, and $T_3$ are 1/240 second or 1/480 second, respectively. Such frame rates can be sufficient to avoid visible flickering due to differences in cluster column drivers 24 performance.

FIG. 9 is a logic diagram illustrating implementations of the embodiments of FIGS. 8A and 8B for a four-column implementation. In such embodiments, two bits are needed to encode the mode value M and can be demultiplexed into four control (mode) signals $M_0$, $M_1$, $M_2$, and $M_3$. Each of $M_0$, $M_1$, $M_2$, and $M_3$ then selects from among $I_0$, $I_1$, $I_2$, and $I_3$ and switches each of $I_0$, $I_1$, $I_2$, and $I_3$ to the appropriate output $O_0$, $O_1$, $O_2$, and $O_3$. As shown in FIG. 8B. Mode signal M can be generated by a two-bit counter, for example driven by a clock with a period one quarter of the frame period and synchronized with the frame period.

Embodiments of the present disclosure are not limited to two or four columns and can comprise any number of columns of light-emitters no less than two, for example six, seven, eight, nine, ten, or twelve. More generally, column multiplexer 26 can comprise N inputs I and N outputs O corresponding to N columns. During each of N time periods each of the N inputs I is uniquely connected to each of the N outputs O in response to multiplexer control signal M and the connections between the N inputs I and the N outputs O are different during each of the N time periods. Where the inputs I and outputs are grouped (e.g., into connection pairs) and each of the groups comprises M inputs I and M outputs O, where M<=N, during each of M time periods the column multiplexer 26 uniquely connects each of the M inputs I to each of the M outputs O for each group and the connection between the M inputs I and the M outputs O for each time period T is different. Each of the inputs I can be a member of a group and each of the outputs O can be a member of a group. Some embodiments comprise an integrated circuit substrate or epitaxy 25, cluster column drivers 24 are constructed on and spatially distributed over the integrated circuit substrate or epitaxy 25, each group comprises a cluster column driver 24 connected to each of the M inputs I, and one or more cluster column drivers 24 of a group are disposed spatially between cluster column drivers 24 of another, different group (e.g., as shown in FIGS. 7B and 7C where M=2). The N time periods can have an equal temporal duration or different temporal durations. Different temporal durations can depend on different average cluster column driver 24 performance for the different groups. For example, if components 14 include light emitters 16, each of the columns of light emitters 16 can have an average luminance, and the temporal duration of each of the N time periods can depend on the relative average luminance of the N columns of light emitters 16.

Generally, a passive-matrix display 50 or portions of a passive-matrix display 50 (e.g., pixel clusters 20) can comprise two or more columns of pixels 14 and a cluster column driver 24 providing a separate and individual drive signal to each column of the two or more columns of pixels 14. Each of cluster column drivers 24 can be operable to separately drive each column of pixels 14 of the two or more columns of pixels 14 with a drive signal during a frame period F. Because non-uniformity in cluster column drivers 24 is reduced, in some embodiments smaller or simpler circuits can be used to drive columns of light emitters 16, thus increasing display 50 resolution.

Display substrate 10 can be any useful substrate on which pixels 14, cluster controllers 22, display row wires 42R, and display column wires 42C can be suitably disposed, for example glass, plastic, resin, fiberglass, semiconductor, ceramic, quartz, sapphire, or other substrates found in the display or integrated circuit industries. Display substrate 10 can be flexible or rigid and can be substantially flat. Display column wires 42C and display row wires 42R can be wires (e.g., photolithographically defined electrical conductors such as metal lines) disposed on display substrate 10 that conduct electrical current or voltage (e.g., control signals) from display column controller 40C to columns of pixel clusters 20 or from display row controller 40R to rows of pixel clusters Similarly, cluster column wires 22C and cluster row wires 22R can be wires (e.g., photolithographically defined electrical conductors such as metal lines) disposed on display substrate 10 or a separate and independent cluster substrate disposed on display substrate 10 that conduct electrical current or voltage (e.g., control signals) from cluster column controller 20C to columns of pixels 14 or from cluster row controller 20R to rows of pixels 14.

Display column controller 40C can be, for example, an integrated circuit or thin-film-transistor circuit that provides control, timing (e.g., clocks) or data signals (e.g., column-data signals) through display column wires 42C to columns of pixel clusters 20 to enable pixel clusters 20 to control light emitted by light emitters 16 in each pixel cluster 20 in flat-panel display 50. Display column controller 40C can comprise a single integrated circuit or can comprise multiple integrated circuits, e.g., electrically connected integrated circuits. The integrated circuit(s) can be micro-transfer printed as unpackaged dies and can comprise broken (e.g., fractured) or separated tether(s). Each display column wire 42C can be electrically separate and optionally independently controlled from every other display column wire 42C by display column controller 40C.

Display row controller 40R can be, for example, an integrated circuit or thin-film-transistor circuit that provides control, timing (e.g., clocks) or data signals (e.g., row-select signals) through display row wires 42R to rows of pixel clusters 20 to enable pixel clusters 20 to control light emitted by light emitters 16 in each pixel cluster 20 in flat-panel display 50. Display row controller 40R can comprise a single integrated circuit or can comprise multiple integrated circuits, e.g., electrically connected integrated circuits. The integrated circuit(s) can be micro-transfer printed as unpackaged dies and can comprise broken (e.g., fractured) or separated tether(s). Each display row wire 42R can be electrically separate and optionally independently controlled from every other display row wire 42R by display row controller 40R.

Cluster column controller 20C can be, for example, an integrated circuit or thin-film-transistor circuit that provides control, timing (e.g., clocks) or data signals (e.g., column-data signals) through display column wires 42C to columns of pixels 14 to enable light emitters 16 in each pixel cluster 20 in flat-panel display 50 to emit light. Cluster column controller 20C can comprise a single integrated circuit or can comprise multiple integrated circuits, e.g., electrically connected integrated circuits. The integrated circuit(s) can be micro-transfer printed as unpackaged dies and can comprise fractured or separated tether(s). Each cluster column wire 22C can be electrically separate and optionally independently controlled from every other cluster column wire 22C by cluster column controller 20C. At least some different electrical characteristics of cluster column drivers 24 can be dependent on the spatial location of the corresponding cluster column drivers 24 within the integrated circuit.

Cluster row controller 20R can be, for example, an integrated circuit or thin-film-transistor circuit that provides control, timing (e.g., clocks) or data signals (e.g., row-select signals) through cluster row wires 22R to rows of pixels 14 to enable light emitters 16 in each pixel cluster 20 in flat-panel display 50 to emit light. Cluster row controller 20R can comprise a single integrated circuit or can comprise multiple integrated circuits, e.g., electrically connected integrated circuits. The integrated circuit(s) can be micro-transfer printed as unpackaged dies and can comprise broken (e.g., fractured) or separated tether(s). Each cluster row wire 22R can be electrically separate and optionally independently controlled from every other cluster row wire 22R by cluster row controller 20R.

Cluster column driver 24 can comprise an integrated circuit or epitaxy 25. Drive circuits suitable for driving columns of light emitters 16 (e.g., with variable current, variable voltage, or constant current for variable amounts of time) can be formed in epitaxy 25. Current sources, voltage sources (e.g., as in a pulse-amplitude modulation circuit), and constant current sources with variable temporal control (e.g., as in a pulse-width modulation circuit) can comprise a transistor circuit responsive to power, ground, and control signals.

Array 12 of pixels 14 can be a completely regular array 12 (e.g., as shown in FIG. 1) or can have rows or columns of pixels 14 that are offset from each other, so that rows or columns of pixels 14 are not disposed in a straight line and can, for example, form a zigzag line (not shown in the Figures) or, as another example, have non-uniform spacing (s).

Light emitters 16 can comprise light-emitting diodes, e.g., inorganic light-emitting diodes such as horizontal inorganic light-emitting diodes or vertical inorganic light-emitting diodes. Inorganic light-emitting diodes can have a small area, for example having a length and a width each no greater than 20 microns, no greater than 50 microns, no greater than 100 microns, or no greater than 200 microns. Such small light emitters 16 leave additional area on display substrate 10 for more or larger wires, e.g., display column wires 42C, display row wires 42R, cluster column wires 22C, cluster row wires 22R, ground and power wires, or cluster controllers 22. Cluster controllers 22 can be disposed between array 12 of light emitters 16 in different pixel clusters 20 or within array 12 of light emitters 16 in a pixel cluster 20.

Pixels 14 or light emitters 16 can be multiple integrated circuits and can be micro-transfer printed onto display substrate 10 together with cluster controller 22 or onto a cluster substrate and the cluster substrate micro-assembled (e.g., micro-transfer printed) onto display substrate 10. The multiple integrated circuits can be small, unpackaged integrated circuits such as unpackaged dies interconnected with wires connected to contact pads on the integrated circuits, for example formed using photolithographic methods and materials. In some embodiments, the integrated circuits are made in or on a semiconductor wafer and have a semiconductor substrate.

In some embodiments, red, green, and blue inorganic LEDs 14 are micro transfer printed to cluster substrates or display substrate 10 in one or more transfers and can comprise broken (e.g., fractured) or separated tethers as a consequence of micro-transfer printing. For a discussion of micro-transfer printing techniques that can be used or adapted for use in methods disclosed herein, see U.S. Pat. Nos. 8,722,458, 7,622,367 and 8,506,867, each of which is hereby incorporated by reference in its entirety. The transferred light emitters 16 are then interconnected, for example with conductive wires and optionally including connection pads and other electrical connection structures, to enable a controller (e.g., display controller 40 or cluster controller 22) to electrically interact with light-controlling elements 14 to emit, or otherwise control, light.

Display substrate 10 or a cluster substrate, or both, can include glass, resin, polymer, plastic, or metal. The cluster substrate can be a semiconductor substrate and one or more of cluster controller 22, cluster column controller 20C and cluster row controller 20R can be formed in or on the cluster substrate (and thus are native to the cluster substrate). Semiconductor materials (for example doped or undoped silicon, GaAs, or GaN) and processes for making small integrated circuits are well known in the integrated circuit arts. Likewise, backplane substrates and means for interconnecting integrated circuit elements on the backplane are well known in the display and printed circuit board arts.

In certain embodiments, display substrate 10 includes material, for example glass or plastic, different from a material in an integrated-circuit substrate, for example a semiconductor material, such as silicon or GaN for example. Light emitters 16 or cluster controllers 22 can be formed separately on separate semiconductor substrates, assembled onto cluster substrates to form pixel clusters 20 and then the assembled units are disposed (e.g., printed) on the surface of the display substrate 10. In some embodiments, light emitters 16 can be formed separately on separate semiconductor substrates in or on which native cluster controller 22 circuits are formed, assembled onto cluster substrates to form pixel clusters 20 and then the assembled units are disposed (e.g., printed) on the surface of the display substrate 10. This arrangement has the advantage that the integrated circuits or pixel clusters 20 can be separately tested on the cluster substrate and pixel clusters 20 accepted, repaired, or discarded before pixel clusters 20 are located on display substrate 10, thus improving yields and reducing costs.

In a method according to some embodiments of the present disclosure, integrated circuits are disposed on the display substrate 10 by micro transfer printing. In some methods, integrated circuits (or portions thereof) or light emitters 16 are disposed on a cluster substrate to form a heterogeneous pixel cluster 20 and pixel cluster 20 is disposed on display substrate 10 using compound micro-assembly structures and methods, for example as described in U.S. patent application Ser. No. 14/822,868 filed Aug. 10, 2015, entitled Compound Micro-Assembly Strategies and Devices. However, since pixel clusters 20 can be larger than the integrated circuits included therein, in some methods of the present disclosure, pixel clusters 20 are, or can be, disposed on display substrate 10 using pick-and-place methods found in the printed-circuit board industry, for example using vacuum grippers. Pixel clusters 20 can be interconnected on display substrate 10 using photolithographic methods and materials or printed circuit board methods and materials, for example.

In some embodiments of the present disclosure, providing flat-panel display 50, display substrate 10, or pixel clusters 20 can include forming conductive wires (e.g., display row wires 42R, display column wires 42C, cluster row wires 22R, and cluster column wires 22C on a substrate (e.g., display substrate 10 or a cluster substrate) by using photolithographic and display substrate 10 processing techniques, for example photolithographic processes employing metal or metal oxide deposition using evaporation or sputtering, curable resin coatings (e.g. SU-8), positive or negative photo-resist coating, radiation (e.g. ultraviolet radiation) exposure through a patterned mask, and etching methods to form patterned metal structures, vias, insulating layers, and electrical interconnections. Inkjet and screen-printing deposition processes and materials can be used to form patterned conductors or other electrical elements. The electrical interconnections, or wires, can be fine interconnections, for example having a width of less than fifty microns, less than twenty microns, less than ten microns, less than five microns, less than two microns, or less than one micron. Such fine interconnections are useful for interconnecting micro-integrated circuits, for example as bare dies with contact pads and used with the cluster substrates. Alternatively or additionally, wires can include one or more crude lithography interconnections having a width from 2 μm to 2 μm, wherein each crude lithography interconnection electrically interconnects pixel clusters on display substrate 10.

In some embodiments, components 14 are operable to emit light, for example when component 14 includes a light emitter or is a pixel 14. In some embodiments, components 14 have functionality other than light emission that is exhibited by operating components 14 using controller 20.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

As is also understood by those skilled in the art, the terms "column" and "row", "horizontal" and "vertical", and "x" and "y" are arbitrary designations that can be interchanged (unless otherwise clear from context).

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular express reference to certain embodiments thereof, but it will be understood that variations and modifications can be effected within the spirit and scope of the following claims.

PARTS LIST

F frame period
I multiplexer input signal
M multiplexer control signal/mode control signal
O multiplexer output signal
T temporal period
10 display substrate
12 array/passive-matrix array
14 pixel/component
16 light emitter
20 pixel cluster
20C cluster column controller/passive-matrix controller
20R cluster row controller
22 cluster controller
22C cluster column wire
22R cluster row wire
24 column driver/cluster column driver/driver circuit
25 epitaxy
26 column multiplexer
28 column shift register
30 transistor switch
32 current source
40 display controller
40C display column controller
40R display row controller
42C display column wire
42R display row wire
50 display

What is claimed:

1. A passive-matrix controller for providing a signal to each column of columns of components with a respective individual column wire, wherein the passive-matrix controller is a column controller, each of the components comprises a light-emitting diode for emitting a color of light for a corresponding pixel in an image, and the light-emitting diode of each of the components in a column emit the same color of light, the column controller comprising:

column drivers, each of the column drivers operable to provide a drive signal for one of the columns of components in response to a pixel control signal, wherein the column drivers are spatially distributed over an epitaxial area of semiconductor epitaxy in a spatial order; and a column multiplexer comprising (i) outputs O arranged in a spatial order and (ii) inputs I, each of the outputs O uniquely connectable to a respective column wire and each of the inputs I connected to one of the column drivers to receive the drive signal, wherein the column multiplexer is a cross-point switch operable to uniquely connect each of the inputs I to a different one of the outputs O in response to a multiplexer control signal provided by the column controller to provide the drive signal from a column driver of the column drivers to one of the outputs O to drive the light-emitting diode for one of the components to emit the color of light such that (i) the column driver is disposed in a different position in the spatial order of the column drivers relative to a position of the one of the outputs Q in the spatial order of the outputs Q of the column multiplexer and (ii) the position of the one of the outputs O corresponds to a position of the corresponding pixel in the image.

2. The passive-matrix controller of claim 1, wherein the multiplexer control signal is a digital signal.

3. The passive-matrix controller of claim 2, wherein the multiplexer control signal is a data signal, a timing signal, or a pulse-width modulation signal.

4. The passive-matrix controller of claim 1, wherein the inputs I comprise a first input and a second input and the outputs O comprise a first output and a second output, and wherein the column multiplexer is operable to connect (i) the first input to the first output and the second input to the second output during a first time period and (ii) the first input to the second output and the second input to the first output during a second time period.

5. The passive-matrix controller of claim 4, comprising connection pairs, each of the connection pairs comprising a first input and a second input of the inputs I and a first output and a second output of the outputs O, and wherein, for each of the connection pairs, the column multiplexer is operable to connect (i) the first input to the first output and the second input to the second output during the first time period and (ii) the first input to the second output and the second input to the first output during a second time period.

6. The passive-matrix controller of claim 5, comprising an integrated circuit substrate, wherein the connection pairs comprise a first connection pair and a second connection pair and the column drivers corresponding to the first connection pair and the column drivers corresponding to the second connection pairs are constructed on and spatially distributed over the integrated circuit substrate, wherein the column drivers comprise a first column driver connected to the first input of the first connection pair, a second column driver connected to the second input of the first connection pair, a third column driver connected to the first input of the second connection pair, and a fourth column driver connected to the second input of the second connection pair, and wherein the third column driver is spatially disposed between the first column driver and the second column driver in the spatial order of the column drivers so that a column driver of the second connection pair is interdigitated with a column driver of the first connection pair.

7. The passive-matrix controller of claim 6, wherein the fourth column driver is spatially disposed between the first column driver and the second column driver in the spatial order of the column drivers.

8. The passive-matrix controller of claim 6, wherein the first connection pair corresponds to spatially adjacent columns of the columns of components and the second connection pair corresponds to spatially adjacent columns of the columns of components, the first connection pair spatially adjacent to the second connection pair.

9. The passive-matrix controller of claim 4, wherein the first time period has a first temporal duration, the second time period has a second temporal duration, and the first temporal duration and the second temporal duration are equal.

10. The passive-matrix controller of claim 4, wherein the first time period has a first temporal duration, the second time period has a second temporal duration, and the first temporal duration and the second temporal duration are not equal.

11. The passive-matrix controller of claim 4, wherein a first column of light emitters having a first average luminance in response to pixel data, the first column is connected to one of the first output and the second output, and a second column of light emitters having a second average luminance in response to the pixel data that is different from the first average luminance, the second column is connected to the other of the first output and the second output, and wherein a ratio of a temporal duration of the first time period to a temporal duration of the second time period depends on a ratio of the first average luminance to the second average luminance.

12. The passive-matrix controller of claim 1, wherein the inputs I comprise N inputs, the outputs O comprise N outputs and the passive-matrix controller is operable to, during each of N time periods, uniquely connect each of the N inputs to each of the N outputs in response to the multiplexer control signal with different connections between the N inputs and the N outputs during each of the N time periods.

13. The passive-matrix controller of claim 12, comprising groups of M column drivers of the column drivers, where $2<M\leq N$, wherein each of the groups of M column drivers is operable to provide drive signals to M ones of the inputs I, wherein the column multiplexer is operable to, during each of M time periods, uniquely connect each of the M inputs to each of the M outputs for each of the groups with different connections between the M inputs and the M outputs for each of the M time periods.

14. The passive-matrix controller of claim 13, wherein each of the inputs I is a member of one of the groups and each of the outputs O is a member of one of the groups.

15. The passive-matrix controller of claim 14, comprising an integrated circuit substrate that comprises semiconductor epitaxy, wherein the column drivers are constructed on and spatially distributed over the integrated circuit substrate, and wherein one or more column drivers of a first one of the groups are disposed spatially between the column drivers of another, different one of the groups.

16. The passive-matrix controller of claim 12, wherein the N time periods have an equal temporal duration.

17. The passive-matrix controller of claim 12, wherein at least some of the N time periods have different temporal durations from each other.

18. The passive-matrix controller of claim 12, wherein the columns of components comprise N columns of light emitters, each of the columns of light emitters having an average luminance, and wherein a temporal duration of each of the N time periods depends on a relative average luminance of the N columns of light emitters.

19. The passive-matrix controller of claim 1, wherein at least some of the column drivers have at least one different electrical performance characteristic from other column drivers in response to same pixel data.

20. The passive-matrix controller of claim 19, comprising an integrated circuit, wherein the column drivers are disposed in the integrated circuit and wherein the at least one different electrical performance characteristic of the column drivers is dependent on spatial locations of the at least some column drivers within the integrated circuit.

21. The passive-matrix controller of claim 1, wherein the passive-matrix controller is a cluster controller operable to control a cluster comprising the columns of the components.

22. A passive-matrix device comprising:

a passive-matrix controller according to claim 1;

the columns of components; and the respective row wire for each of the outputs O, wherein each of the outputs O is connected to the respective row wire and the respective row wire is connected to its column of the columns of components.

23. The device of claim 22, wherein the components are pixels.

24. The device of claim 22, wherein each of the components comprises a light emitter.

25. The device of claim 22, wherein the device is a display.

* * * * *